US012663139B2

(12) United States Patent
Zeng

(10) Patent No.: US 12,663,139 B2
(45) Date of Patent: Jun. 23, 2026

(54) AIR CUSHION TUBE LIGHT

(71) Applicant: YINGYOU EQUIPMENT CO., LTD., Shenzhen (CN)

(72) Inventor: Weiling Zeng, Shenzhen (CN)

(73) Assignee: YINGYOU EQUIPMENT CO., LTD., Shenzhen (CN)

( * ) Notice: Subject to any disclaimer, the term of this patent is extended or adjusted under 35 U.S.C. 154(b) by 0 days.

(21) Appl. No.: 19/114,837

(22) PCT Filed: May 17, 2024

(86) PCT No.: PCT/CN2024/093912

§ 371 (c)(1),
(2) Date: Mar. 25, 2025

(87) PCT Pub. No.: WO2025/025744

PCT Pub. Date: Feb. 6, 2025

(65) Prior Publication Data

US 2026/0022814 A1 Jan. 22, 2026

(30) Foreign Application Priority Data

Jul. 31, 2023 (CN) ......................... 202322043445.5

(51) Int. Cl.
*F21V 3/02* (2006.01)
*F21S 4/28* (2016.01)
(Continued)

(52) U.S. Cl.
CPC ................ *F21V 3/026* (2013.01); *F21S 4/28* (2016.01); *F21V 7/005* (2013.01); *F21V 17/18* (2013.01); *F21V 21/32* (2013.01); *F21Y 2103/10* (2016.08)

(58) Field of Classification Search
CPC . G03B 15/06; G03B 2215/0589; F21V 3/026; F21V 1/06; F21Y 2103/10; F21Y 2115/10; F21Y 2103/00; F21Y 2105/00
See application file for complete search history.

(56) References Cited

U.S. PATENT DOCUMENTS 4,887,193 A * 12/1989 Dieckmann ............ F21V 21/32 362/89
2002/0089854 A1* 7/2002 Liu .......................... F21V 3/00 362/311.06
2024/0401769 A1* 12/2024 Matuschek ............ F21V 17/10

FOREIGN PATENT DOCUMENTS

CN 210514896 5/2020
CN 217085489 7/2022
(Continued)

OTHER PUBLICATIONS

Search English translation of DE 202021100006 U1 (Year: 2021).*
(Continued)

*Primary Examiner* — Omar Rojas Cadima
(74) *Attorney, Agent, or Firm* — Hodgson Russ LLP

(57) ABSTRACT

An air cushion tube light includes a reflector which is provided with an accommodating cavity having an open end surface, the inner side surface of the reflector is a reflective surface; an air cushion which comprises an inflatable main body portion, the side surface of the main body portion includes a soft light surface and a light-transmitting surface arranged opposite to each other, the air cushion is disposed at the opening of the accommodating cavity, the reflector corresponds to and covers the light-transmitting surface of the air cushion, and the soft light surface can scatter light; and tube lights disposed in the accommodating cavity of the reflector and located between the reflective surface of the reflector and the light-transmitting surface of the air cushion, the light emitted from the tube lights passes through the
(Continued)

light-transmitting surface, and then is emitted through the soft light surface.

13 Claims, 6 Drawing Sheets

(51) Int. Cl.

| | |
|---|---|
| ***F21V 7/00*** | (2006.01) |
| ***F21V 17/18*** | (2006.01) |
| ***F21V 21/32*** | (2006.01) |
| *F21Y 103/10* | (2016.01) |

(56) References Cited

FOREIGN PATENT DOCUMENTS

| | | | | |
|---|---|---|---|---|
| CN | 218721024 | | 3/2023 | |
| CN | 220323689 | | 1/2024 | |
| DE | 102016003852 | | 9/2017 | |
| DE | 202021100006 | | 1/2021 | |
| DE | 202021100006 | U1 * | 1/2021 | .............. F21V 17/10 |
| FR | 2995665 | A1 * | 3/2014 | .............. F21V 3/026 |
| KR | 200294969 | | 11/2002 | |

OTHER PUBLICATIONS

Search English translation of FR 2995665 A1 (Year: 2014).*
Aladdin Mosaic tube 4 & 8, https://youtu.be/L-R-zqza9yc?si=XVJkPUa5hQbrfuD1 (Year: 2023).*
Video snapshots (Year: 2023).*
WIPO, International Search Report for PCT/CN2024/093912, Jul. 23, 2024.
EPO, Extended European Search Report for EP Application No. 24847709.3, Dec. 10, 2025.

* cited by examiner

AIR CUSHION TUBE LIGHT

CROSS-REFERENCE TO RELATED APPLICATIONS

This application is a national stage entry under 37 U.S.C. § 371 of International Application No. PCT/CN2024/093912, filed on May 17, 2024, which claims priority to Chinese Patent Application No. 202322043445.5, filed on Jul. 31, 2023, the entire disclosures of which are hereby incorporated herein by reference.

TECHNICAL FIELD

The present application relates to the technical field of a photographic equipment, particularly to an airbag tube light.

BACKGROUND

In today's live broadcast, still life shooting, wedding photography, image photo shooting and other scenarios, in order to achieve better photographic effect, photographers often need to use the tube light for the subject or photographic site to make up the light or to provide photographic light effect, but since the existing light emitted by the tube light is the hard light, it cannot be very good to meet the requirements of the current photographic camera.

SUMMARY

There is provided an airbag tube light according to embodiments of the present application. The technical solution is as below:

According to a first aspect of embodiments of the present application, there is provided an airbag tube light, which includes:

- a reflective cover, provided with an accommodation cavity, where the accommodation cavity is provided with an opening at an end of the reflective cover, and an inner side of the reflective cover is a reflective surface;
- an airbag, including an inflatable main body portion, wherein a side of the main body portion includes a soft light surface and a light-transmitting surface opposite to each other, the airbag is provided in the opening of the accommodation cavity, and the reflective cover corresponds to and is covered in the light-transmitting surface of the airbag; and
- a tube light, provided in the accommodation cavity of the reflective cover and provided between the reflective surface of the reflective cover and the light-transmitting surface of the airbag, where the light-transmitting surface of the tube light faces the light-transmitting surface of the airbag, to make light emitted by the tube light pass through the light-transmitting surface and then emitting out from the soft light surface, to realize a scattering of the light.

DETAILED DESCRIPTION OF THE EMBODIMENTS

Figure 1:
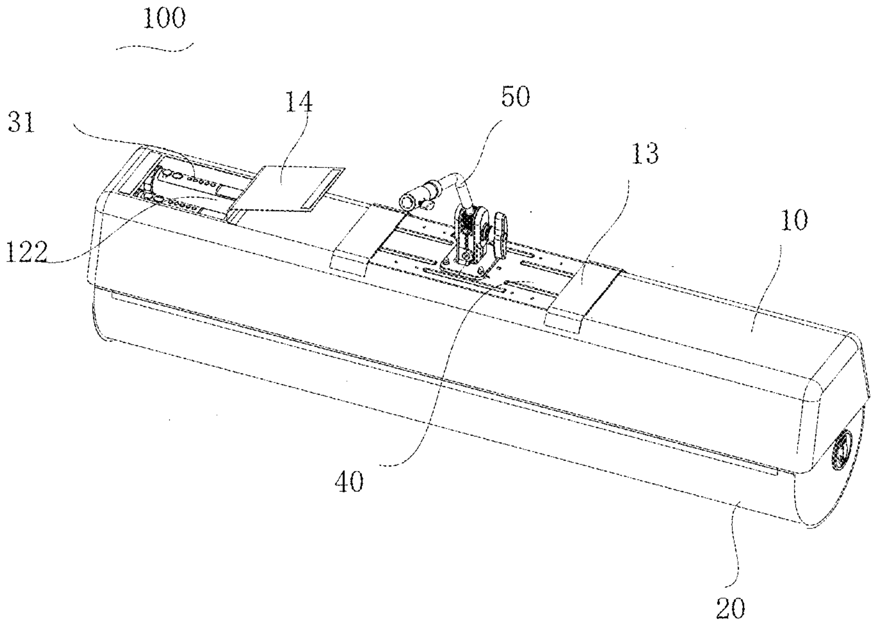
FIG. 1 is a three-dimensional structure view of the airbag tube light at one angle.

Embodiments embodying the features and advantages of the present application will be described in detail in the following description. It is to be understood that the present application is capable of various variations in different embodiments, none of which is outside the scope of the present application, and that the descriptions and drawings therein are intended to be illustrative in nature and are not intended to limit the present application.

In the description of the present application, it is to be understood that in the embodiments shown in the accompanying drawings, indications of orientation or positional relationships (such as up, down, left, right, forward and backward, etc.) are provided solely for the purpose of facilitating and simplifying the description of the present application, rather than indicating or implying that the device or element referred to must have a particular orientation, be constructed and operated in a particular orientation. These descriptions are appropriate when these elements are in the positions shown in the accompanying drawings. If the description of the position of these elements is changed, the indications of these orientations are changed accordingly.

Furthermore, the terms "first" and "second" are used only for descriptive purposes and are not to be understood as indicating or implying relative importance or implicitly specifying the number of technical features indicated. Thus, a feature defined with "first" and "second" may expressly or implicitly include one or more of the described features. In the description of the present application, "more than one" means two or more, unless otherwise expressly and specifically limited.

Referring to FIGS. 1 to 11, this embodiment provides an airbag tube light 100, which includes an airbag 20, a tube light 30, a reflective cover 10, a tube light bracket 40, and a gooseneck bracket 50. The reflective cover 10 is provided on a side of the airbag 20, and the tube light 30 is provided between the reflective cover 10 and the airbag 20, so that the light emitted from the tube light 30 can be emitted through the airbag 20 to achieve a soft light effect.

Figure 3:
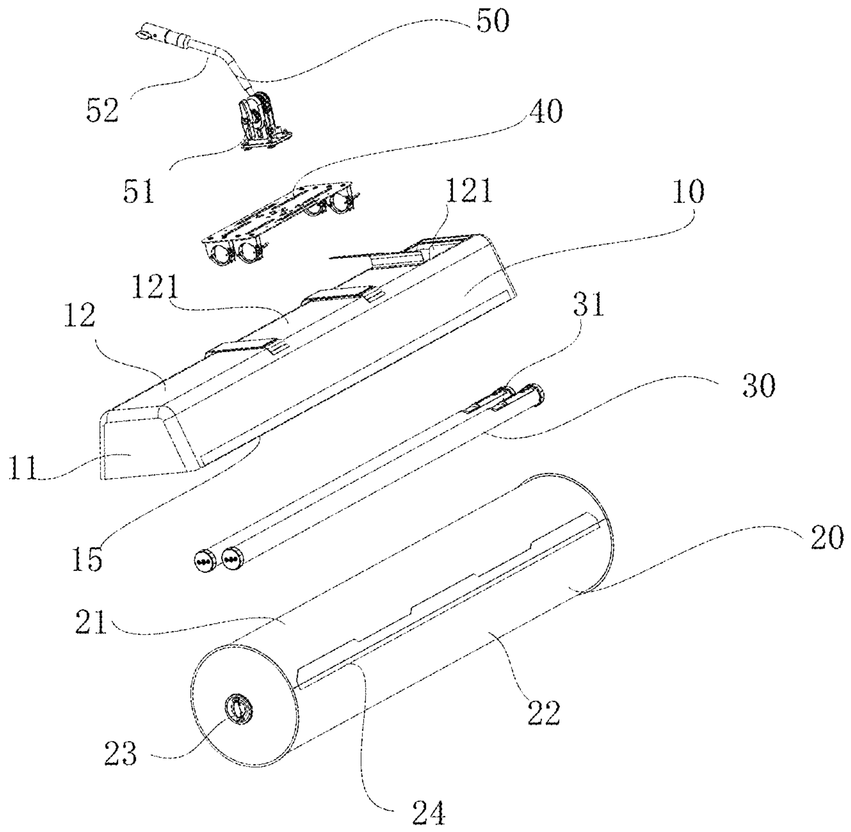
FIG. 3 is a decomposed structure view of the airbag tube light in FIG. 1.

Referring to FIGS. 1 and 3, the reflective cover 10 in the present embodiment is provided with an accommodation cavity 101 with an end opening for accommodating the tube light 30 and a portion of the airbag 20. An inner side surface of the reflective cover 10 is a reflective surface 111, which can reflect the light emitted from the tube light 30 in the accommodation cavity 101, so that all of the light emitted from the accommodation cavity 101 is emitted out from the opening of the accommodation cavity 101 and passes through the airbag 20 provided at the opening for scattering the light through the airbag 20 to reach the soft light effect.

Figure 2:
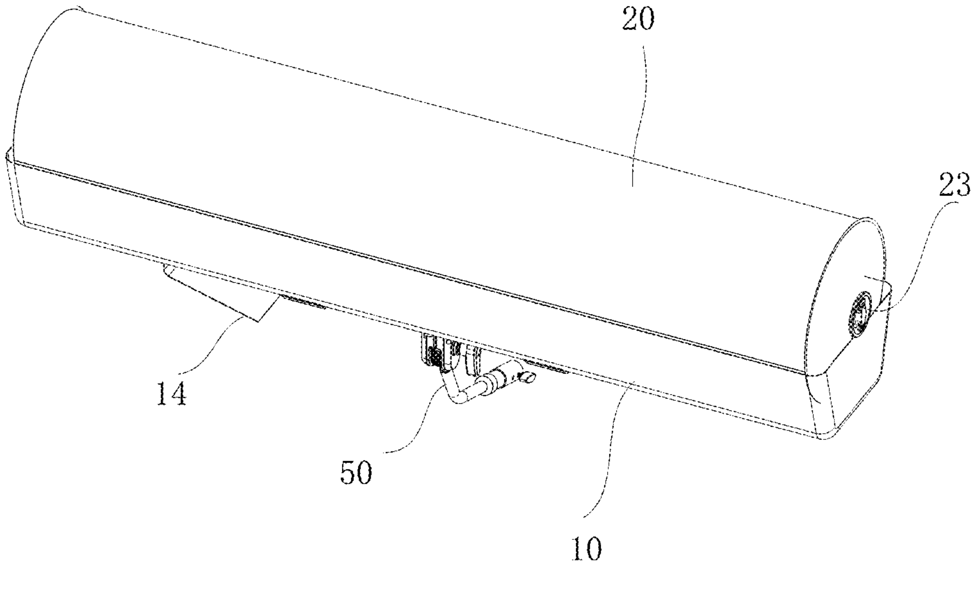
FIG. 2 is a three-dimensional structure view of the airbag tube light at another angle.

Please refer to FIGS. 1 to 3, in this embodiment, the reflective cover 10 includes a cover body 11 and a top plate 12, two ends of the cover body 11 has openings at two ends and has hollow inside, the top plate 12 is hermetically provided at the opening of the cover body 11, the opening at an end of the cover body 11 relative to the top plate 12 forms the opening of the reflective cover 10, and the airbag 20 can be fixed on the opening of the cover body 11.

Specifically, in this embodiment, the cover body 11 is formed by enclosure of four side panels, and the four side panels and the top plate 12 together enclose to form the accommodation cavity 101 of the reflective cover 10, and the shape of the accommodation cavity 101 matches the shape of the airbag 20, so that the airbag 20 can completely seal the opening of the reflective cover 10 to prevent light leakage.

Referring to FIG. 3, the airbag 20 in this embodiment includes an inflatable main body portion 201, and the side surfaces of the main body portion 201 include a soft light surface 22 and a light-transmitting surface 21 opposite to each other. The airbag 20 is provided at the opening of the reflective cover 10, and the reflective cover 10 corresponds to and is covered in the light-transmitting surface 21 of the airbag 20, so that the light emitted from the tube light 30 located between the reflective surface 111 of the reflective cover 10 and the light-transmitting surface 21 of the airbag 20 can smoothly pass through the light-transmitting surface 21 and then be emitted out from the soft light surface 22.

The soft light surface 22 of the airbag 20 in this embodiment is curved and protruded from the opening of the reflective cover 10, so that the light passing through the soft light surface 22 can be dispersed over a larger area. The curved soft light surface 22 provides a larger illumination area, allowing for the larger area to be illuminated by the airbag tube light 100.

As shown in FIGS. 2 and 3, the airbag 20 in this embodiment includes two bottom surfaces and one side surface enclosed to form a cylindrical air column. The bottom surface is provided with an inflation opening 23, through which the airbag 20 is inflated to make the airbag 20 cylindrical. The side walls of the airbag 20 are formed by enclosure of the light-transmitting surface 21 and the soft light surface 22. The light-transmitting surface 21 is formed by a transparent film that can transmit light, and the soft light surface 22 is formed by a soft light cloth that can scatter light. The cylindrical airbag 20 is fixed to the opening of the reflective cover 10, completely shielding the opening of the reflective cover 10, so that the light emitted from the tube light 30 inside the reflective cover 10 can pass through the light-transmitting surface 21 and then emit out from the light soft surface 22 to soften the light.

Referring further to FIG. 3, the airbag 20 is provided with a first velcro 24 on the outside of the airbag 20, the first velcro 24 is provided at where the soft light surface 22 contacts the light-transmitting surface 21. A second velcro 15 is provided at the opening of the reflective cover 10, and the first velcro 24 is bonded with the second velcro 15 to fix the airbag 20 to the reflective cover 10.

Specifically, the first velcro 24 on the airbag 20 is provided at where the light-transmitting surface 21 contacts the soft light surface 22 of the airbag 20 and is provided along the axis of the airbag 20. Correspondingly, the second velcro 15 on the reflective cover 10 is provided on the inner side surface of the opening of the reflective cover 10. The airbag 20 can be bonded to the opening of the accommodation cavity 101 of the reflective cover 10 to allow the reflective cover 10 to completely cover the light-transmitting surface 21 of the airbag 20. The use of velcro to bond the airbag 20 can facilitate the removal and connected of the airbag 20 to the reflective cover 10.

Figure 6:
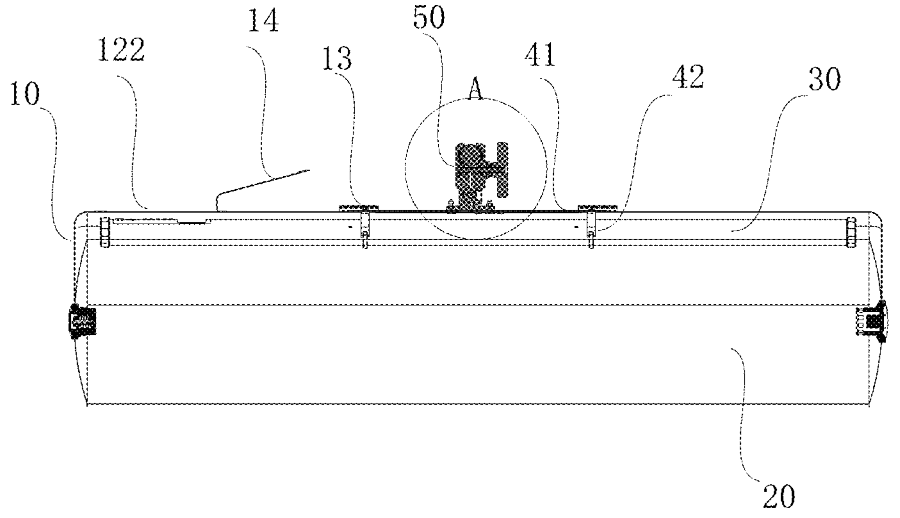
FIG. 6 is a sectional structure front view of the airbag tube light in FIG. 5.

Please continue to refer to FIGS. 3 and 6, the tube light 30 in this embodiment is provided in the accommodation cavity 101 of the reflective cover 10 and is located between the reflective surface 111 of the reflective cover 10 and the light-transmitting surface 21 of the airbag 20. The light emitted from the tube light 30 is reflected by the reflective surface 111 and then passes through the light-transmitting surface 21, or directly passes through the light-transmitting surface 21 and then is emitted out from the soft light surface 22.

Specifically, at least two tube lights 30 are provided in this embodiment, and a plurality of tube lights 30 are provided row-by-row along a width direction of the reflective cover 10. A plurality of tube lights 30 are provided row-by-row, which can increase the light intensity. Moreover, a light emitting surface of the tube light 30 faces the light-transmitting surface 21 of the airbag 20 to reduce the loss of light intensity after the light is reflected from the reflective cover 10.

The tube lights 30 in this embodiment are all elongated, and the shape of the light illumination surface formed by the light emitted from the tube lights 30 is also elongated rectangle. In some shooting scenes, in order to increase the width of the illumination surface, it is necessary to install more than two parallel tube lights 30 together. However, because the brightness of the light illumination surface of each tube light 30 is brighter in the center, and gradually becomes darker in the regions surrounding the center. If the light emitted from all the tube lights 30 does not pass through the airbag 20, but is directly emitted, the light illumination surface formed by the plurality of tube lights 30 will form a bright and dark striped region, which results in an uneven distribution of the overall light of the airbag tube light 100, and affects the optical photographic effect at a certain extent.

In this embodiment, the light emitted by all the tube lights 30 is scattered by the curved soft surface 22 of the airbag 20, and the light emitted from all the tube lights 30 is re-mixed to form a new light illumination surface after scattering. which solves the problem that the light illumination surface formed by the plurality of tube lights 30 will form a bright and dark striped region, such that the overall light is distributed more evenly in the new light illumination surface. The curved soft light surface 22 also expands the illumination angle and illumination area of light, to make the light emitted softer and effectively improve the light illumination effect.

Figure 9:
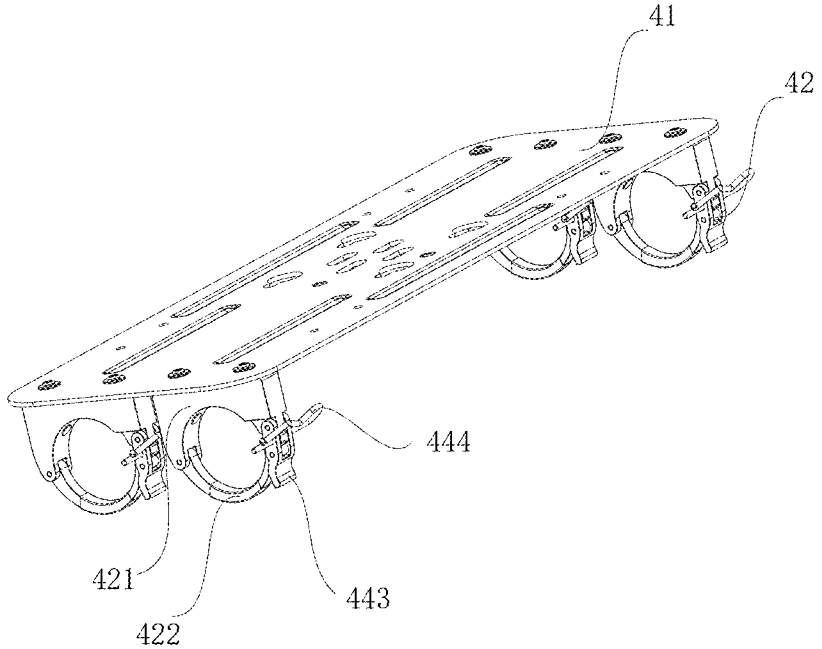
FIG. 9 is an enlarged structure view of the tube light bracket of the airbag tube light in FIG. 3.
Figure 10:
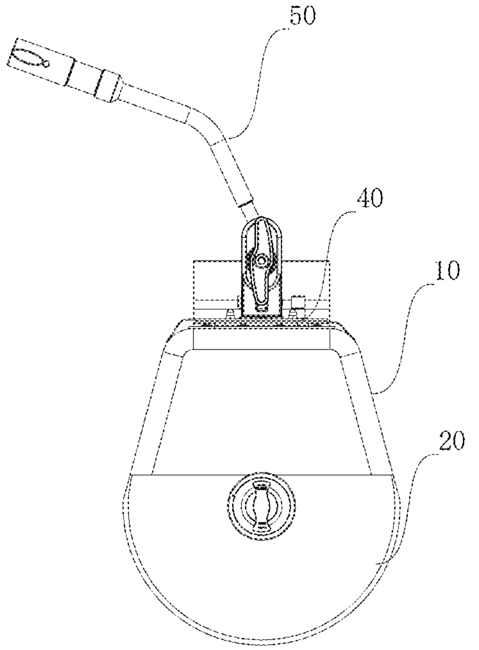
FIG. 10 is a structure side view of the airbag tube light of FIG. 1.
Figure 11:
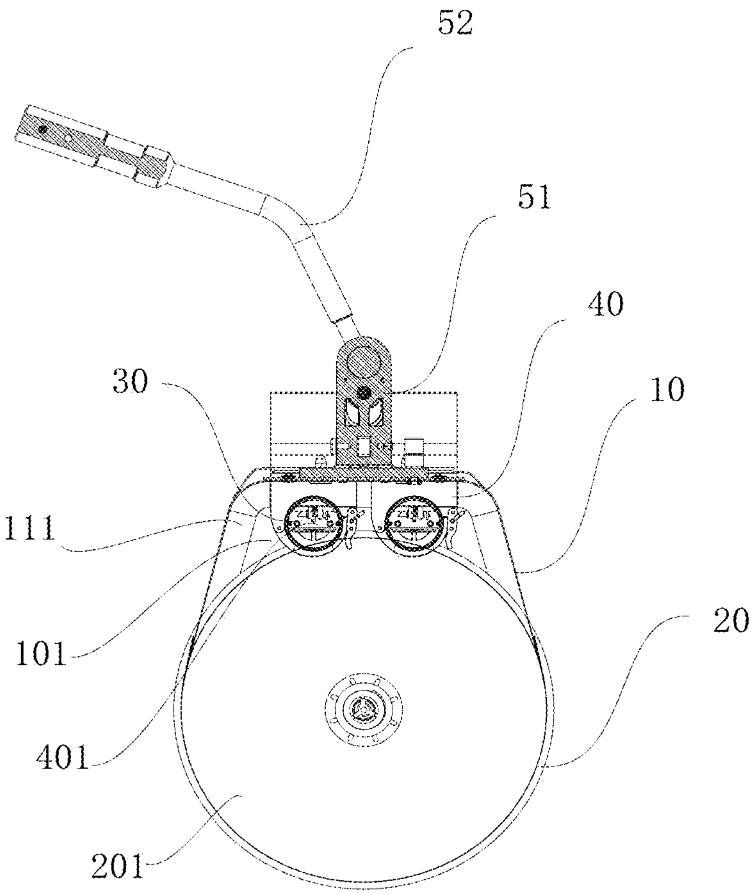
FIG. 11 is a sectional structure side view of the airbag tube light in FIG. 10.

Referring to FIGS. 3 and 9, the tube light bracket 40 in this embodiment is used to fix the tube light 30 in the accommodation cavity 101 of the reflective cover 10.

The tube light bracket 40 includes at least two tube light accommodation positions 401 for connecting the plurality of tube lights 30. The plurality of tube light accommodation positions 401 are provided row-by-row along a width direction of the reflective cover 10 to make the tube lights 30 arranged on the tube light accommodation positions 401 row-by-row.

One tube light 30 is connected to one tube light accommodation position 401 to enable the plurality of tube lights 30 to be arranged row-by-row within the reflective cover 10. In some embodiments, the tube light accommodation position 401 may be a snap, adhesive tape, or magnetic block, as long as the tube lights 30 can be fixed.

Specifically, referring to FIG. 9, the tube light bracket 40 includes a plate body 41 and a latch 42 provided on the plate body 41. The plate body 41 is connected to a top surface of the reflective cover 10, and the latch 42 is extended into the accommodation cavity 101 of the reflective cover 10 and is connected to the tube light 30. Each tube light accommodation position 401 includes a plurality of latches 42 arranged opposite to each other along the length direction of the reflective cover 10, and the tube light 30 is passed through and provided in the latch 42 along the length direction of the reflective cover 10.

As shown in FIGS. 3 and 6, the top plate 12 in this embodiment is provided with a through hole 121 for the latch 42 to pass through, the through hole 121 is located in the center of the top plate 12. The latch 42 of the tube light bracket 40 can be extended into the accommodation cavity 101 of the reflective cover 10 through the through hole 121. The plate body 41 covers the through hole 121 and abuts against the top surface of the top plate 12.

The area of the plate body 41 of the tube light bracket 40 is slightly larger than the area of the through hole 121 in the top plate 12, such that the latch 42 can extend into the accommodation cavity 101 through the through hole 121 in the top plate 12 and the plate body 41 can attach to the top surface of the top plate 12 of the reflective cover 10 and cover the through hole 121.

Figure 4:
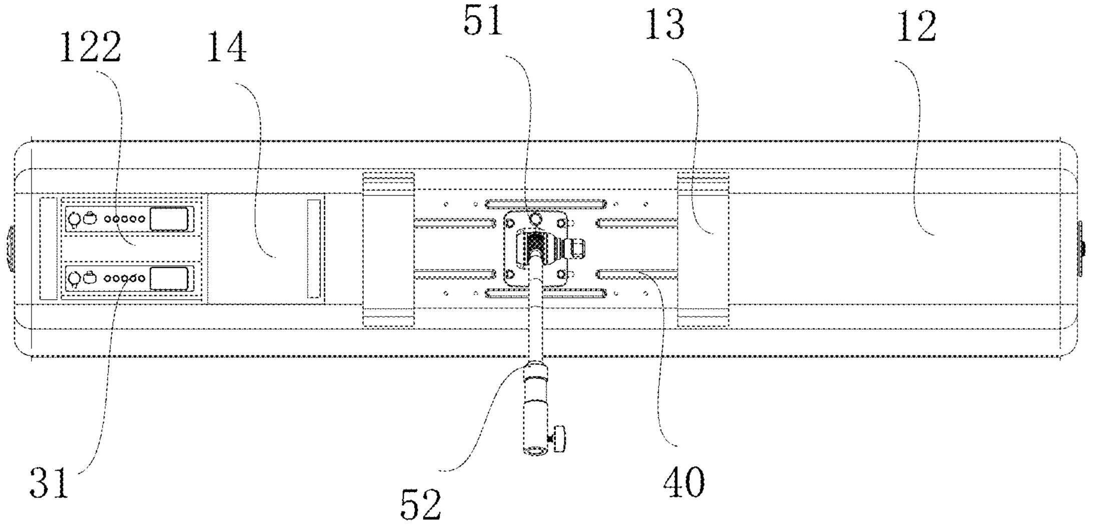
FIG. 4 is a top view of the airbag tube light in FIG. 1.

Referring to FIGS. 3 and 4, the top plate 12 in this embodiment is provided with a strap 13. The strap 13 is provided along the width direction of the top plate 12, so that when the plate body 41 of the tube light bracket 40 is covered on the through hole 121 of the top plate 12, the strap 13 is abutted against the plate body 41 to press and fix the plate body 41 of the tube light bracket 40 on the top surface of the top plate 12.

Specifically, two straps 13 in this embodiment are provided to strap two ends of the tube light bracket 40, so that the plate body 41 of the tube light bracket 40 can be tightly pressed and fixed to the top surface of the top plate 12. Each strap 13 is formed by bonding two sections of velcro straps that can be bonded to each other. When the two velcro straps are bonded to each other to form a single plate strap 13, the plate body 41 of the tube light bracket 40 is pressed tightly. When the two velcro straps are detached from each other, the fixation of the tube light bracket 40 is released, and the tube light bracket 40 can be removed from the reflective cover 10, such that the tube light bracket 40 and the reflective cover 10 can be rapidly fixed and removed.

It may be contemplated that the strap 13 may also be an elastic rubber band strap, which may be pulled to realize the removal of the tube light bracket 40 and the installation and removal of the reflective cover 10.

Referring to FIG. 9, four latches 42 of the tube light bracket 40 of this embodiment are provided, two latches as a set form a tube light accommodation position 401 to fix one tube light 30. The latch 42 includes a fixation portion 421, a rotation portion 422, and a locking portion 443.

An end of the fixation portion 421 is rotatably connected to the rotation portion 422, and another end of the fixation portion 421 is provided with a locking portion 443, and a free end of the rotation portion 422 can be clamped with the locking portion 443 on the fixation portion 421, so that the rotation portion 422 is connected to the fixation portion 421 to form a mounting hole for mounting the tube light.

Specifically, the fixation portion 421 and the rotation portion 422 in this embodiment are two curved snapping groove members that can be rotated relative to each other. The fixation portion 421 is fixed to the bottom surface of the plate body 41, and an end of the rotation portion 422 is rotatably connected to an end of the fixation portion 421 by a rotation shaft, and when the free end of the rotation portion 422 is close to the fixation portion 421, the rotation portion 422 and the fixation portion 421 enclose to form a circular mounting hole, so that the tube light can be fixed in the mounting hole. The rotation portion 422 is rotatable relative to the fixation portion 421, which can facilitate the installation of the tube light 30.

When the free end of the rotation portion 422 is close to and connected with the fixation portion 421, the locking portion 443 at another end of the fixation portion 421 needs to be rotated, so that the locking portion 443 and the rotation portion 422 are snapped and fixed to lock the rotation portion 422, so that the rotation portion 422 and the fixation portion 421 can be fixed to each other.

The latch 42 in this embodiment further includes a safety pin 444, which passes through the locking portion 443 and the rotation portion 422, to further lock the rotation portion 422 to prevent the rotation portion 422 and the locking portion 443 from separating from each other.

Referring to FIGS. 1, 3, and 4, in this embodiment, a window 122 is provided on the top plate 12 of the reflective cover 10, and the tube light 30 is provided with a control panel 31, and the window 122 is provided opposite to the control panel 31. The window 122 is provided with a movable cover plate 14, and the movable cover plate 14 can open or close the window 122.

Specifically, the movable cover plate 14 in this embodiment is provided at the window 122 of the top plate 12 and is flexibly connected to the top plate 12, so that the movable cover plate 14 can be folded along the connection with the top plate 12, thereby opening the window 122 on the top plate 12, such that an operator can operate the control panel 31 on the tube light through the window 122 to turn off or turn on the tube light, or to adjust the brightness of the tube light. The movable cover plate 14 and the top plate 12 are also provided with a velcro, and when the movable cover plate 14 is covered on the window 122 on the top plate 12, the velcro enables the movable cover plate 14 and the top plate 12 to be fixed to each other, thereby rapidly opening and closing the movable cover plate 14, and preventing the window 122 from light leakage.

In some embodiments, the movable cover plate 14 and the top plate 12 are connected by a slide groove, the slide groove is provided on the top surface of the top plate 12, and the movable cover plate 14 is slidably connected within the slide groove of the top plate 12. The movable cover plate 14 slides along the length direction of the top plate 12 to open or close the window 122 of the top plate 12.

Referring to FIGS. 3, 5, 6, and 7, the airbag tube light 100 of the present embodiment further includes a gooseneck bracket 50, which is connected to the tube light bracket 40 via the gooseneck bracket 50 to connect the airbag tube light 100 to an external device.

As shown in FIG. 3, the gooseneck bracket 50 includes a connection seat 51 and a connection rod 52. The connection seat 51 is detachably connected to the tube light bracket 40. An end of the connection rod 52 is connected to the connection seat 51 and another end of the connection rod 52 is connected to the external device to fix the airbag tube light 100 to the external device.

The connection seat 51 is abutted against the top surface of the plate body 41 of the tube light bracket 40 and is fixed to the plate body 41 through a bolt to realize the removable connection of the connection seat 51 with the tube light bracket 40. A connection hole is provided at an end of the connection rod 52 away from the connection seat 51, so that the external device can be inserted into the connection hole to fix the airbag tube light 100 to the external device, there is no need to hold the airbag tube light 100.

Figure 5:
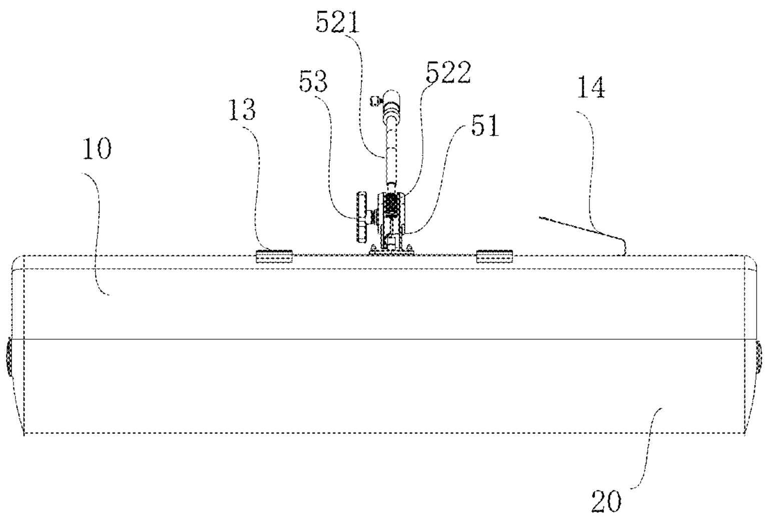
FIG. 5 is a front view of the airbag tube light in FIG. 1.
Figure 7:
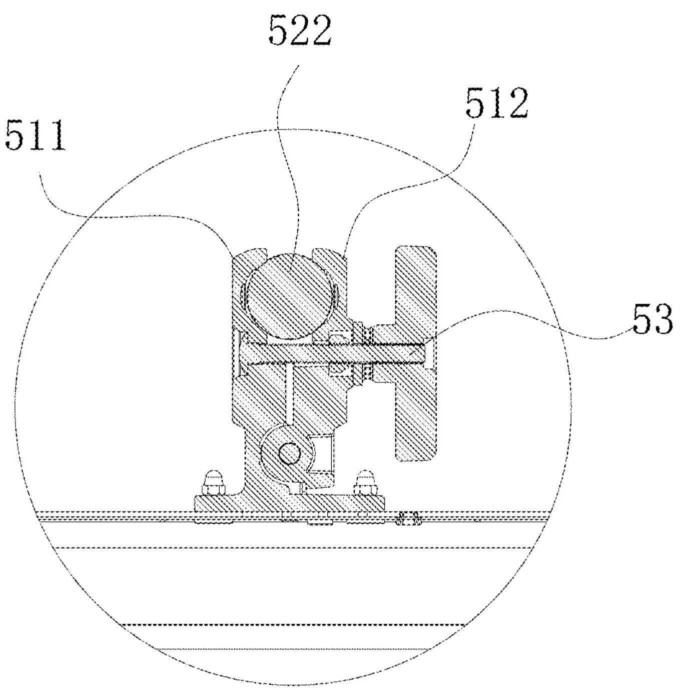
FIG. 7 is an enlarged structure view of the airbag tube light at position A in FIG. 6.
Figure 8:
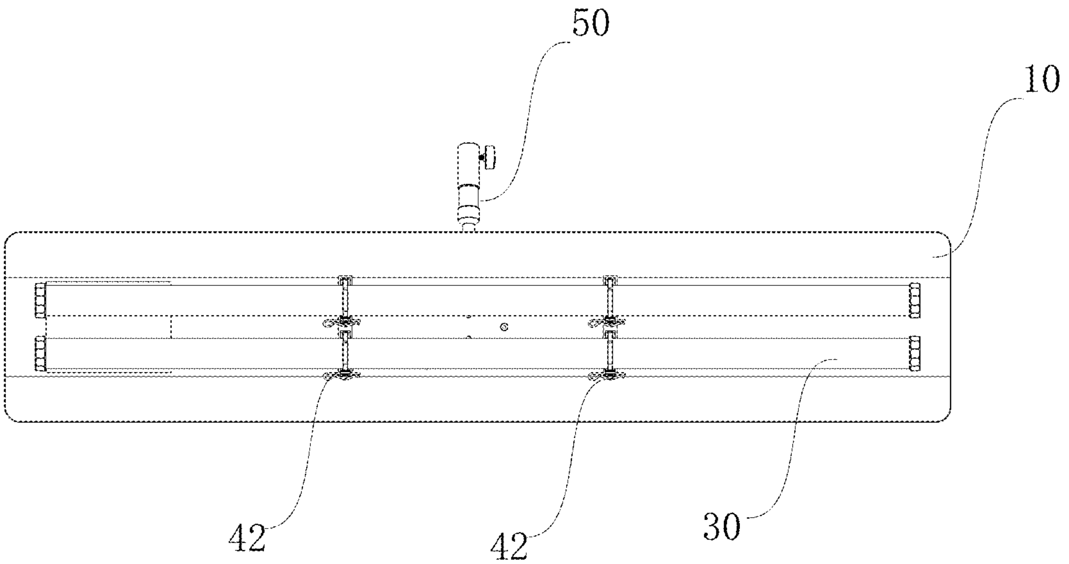
FIG. 8 is a view from below of the airbag tube light in FIG. 1 when the airbag is not installed.

Referring to FIGS. 5 and 7, the gooseneck bracket 50 further includes a fastener 53. The connection seat 51 includes a first connection plate 511 and a second connection plate 512, the first connection plate 511 is opposite to the second connection plate 512 and an end of the connection rod 52 is clamped between the first connection plate 511 and the second connection plate 512. A fastener 53 is passed through and provided in the first connection plate 511 and the second connection plate 512 and abutted against the first connection plate 511 and the second connection plate 512 for adjusting the spacing between the first connection plate 511 and the second connection plate 512, thereby adjusting the looseness or tightness between the connection rod 52 and the connection seat 51.

Specifically, referring to FIG. 7, the first connection plate 511 and the second connection plate 512 of the connection seat 51 are spaced apart from each other, and a mounting cavity is formed in a spacing between the first connection plate 511 and the second connection plate 512. The connection rod 52 includes a rod body 521 and a connection head 522 provided at an end of the rod body 521, the connection head 522 is spherical, and a plurality of teeth are provided on an outside surface of the connection head 522 for increasing friction during fixation. The connection head 522 of the connection rod 52 is provided in the mounting cavity of the first connection plate 511 and the second connection plate 512, and can be rotated relative to the mounting cavity to adjust a connection angle of the entire connection rod 52.

A bottom of the first connection plate 511 and a bottom of the second connection plate 512 are hinged by a pivot. The fastener 53 includes a threaded rod and a handle, and the threaded rod is threadedly connected to the handle after passing through the first connection plate 511 and the second connection plate 512 in turn. When the handle is positively rotated, the handle and the threaded rod are moved away from each other, so that the distance between the first connection plate 511 and the second connection plate 512 are also moved away from each other, increasing the spacing between the first connection plate 511 and the second connection plate 512, so that the connection head 522 of the connection rod 52 can be rotated in the mounting cavity between the first connection plate 511 and the second connection plate 512. At this time, the angle of the connection rod 52 can be adjusted, thereby adjusting an angle at which the light is emitted from the airbag tube light 100.

When the adjustment is completed, the handle is rotated in a reversed direction, so that the handle and the threaded rod are close to each other, and the first connection plate 511 and the second connection plate 512 are pressed against each other, so that they are close to each other. At this time, the first connection plate 511 and the second connection plate 512 clamp and fix the connection head 522 of the connection rod 52, to fix the angle of the connection rod 52. With such a structure, it is possible to adjust an angle at which the light is emitted from the airbag tube light 100 at any time after the airbag tube light 100 is fixed on the external device frame.

In summary, the present application provides an airbag tube light 100, the reflective cover 10 is provided with an accommodation cavity 101, an end of the accommodation cavity 101 is provided with an opening, and the tube light 30 is provided in the accommodation cavity 101 of the reflective cover 10. The airbag 20 is provided at the opening of the accommodation cavity 101, and the reflective cover 10 is covered on the light-transmitting surface 21 of the airbag 20. Since the airbag 20 with a soft light surface 22 is provided on the airbag tube light 100, the light emitted from the tube light 30 is scattered through the curved soft light surface 22 of the airbag 20, which enlarges the illumination angle and area of the light, and the light emitted from the tube light 30 is changed from hard light to soft light by scattering of the soft light surface 22, which is more suitable for photography and video recording. In addition, the light emitted by the tube light 30 is scattered by the curved soft light surface 22, effectively eliminating brighter or darker areas, and its light intensity is evenly distributed, with better lighting effect.

While the present application is described with reference to several exemplary embodiments, it should be understood that the terms used are illustrative and exemplary, not limiting. Since the invention can be practiced in a variety of forms without departing from the spirit or substance of the present application, it should be understood that the foregoing embodiments are not limited to any of the foregoing details but should be construed broadly within the spirit and scope of the accompanying claims, and therefore all variations and adaptations falling within the scope of the claims, or their equivalents, should be covered by the accompanying claims.

What is claimed is:

1. An airbag tube light, comprising:

a reflective cover, provided with an accommodation cavity, wherein the accommodation cavity is provided with an opening at an end of the reflective cover, and an inner side of the reflective cover is a reflective surface;

an airbag, comprising an inflatable main body portion, wherein a side of the main body portion comprises a soft light surface and a light-transmitting surface opposite to each other, the airbag is provided in the opening of the accommodation cavity, and the reflective cover corresponds to and is covered in the light-transmitting surface of the airbag; and a tube light, provided in the accommodation cavity of the reflective cover and provided between the reflective surface of the reflective cover and the light-transmitting surface of the airbag, wherein a light-transmitting surface of the tube light faces the light-transmitting surface of the airbag, to make light emitted by the tube light pass through the light-transmitting surface of the airbag and then emitting out from the soft light surface, to realize a scattering of the light;

wherein the airbag tube light further comprises a tube light bracket, and the tube light bracket is provided on the reflective cover, wherein the tube light bracket comprises at least two tube light accommodation positions, and a plurality of tube light accommodation positions are provided row-by-row in a width direction of the reflective cover, to make tube lights arranged on the at least two tube light accommodation positions row-by-row;

wherein the tube light bracket comprises a plate body and a plurality of latches provided on the plate body, the plate body is connected to the reflective cover, and each latch is extended into the accommodation cavity of the reflective cover, wherein each of the at least two tube light accommodation positions comprises a plurality of latches opposite to each other along a length direction of the reflective cover, and the tube light is passed through and provided in each latch in the length direction of the reflective cover.

2. The airbag tube light according to claim 1, wherein a top surface of the reflective cover is provided with a window, a rear side of the tube light is provided with a control panel, and the window is opposite to the control panel, wherein the window is provided with a movable cover plate, and the movable cover plate is able to open or close the window.

3. The airbag tube light according to claim 1, wherein an outside of the airbag is provided with a first velcro, the first velcro is provided at where the soft light surface contacts the light-transmitting surface, and the opening of the reflective cover is provided with a second velcro, and the first velcro is bonded with the second velcro to fix the airbag to the reflective cover.

4. The airbag tube light according to claim 1, wherein each latch comprises a fixation portion, a rotation portion and a locking portion, wherein an end of the fixation portion is rotatably connected to the rotation portion, and another end of the fixation portion is connected to the locking portion, and a free end of the rotation portion is snapped with the locking portion, to make the rotation portion connect the fixation portion to form a mounting hole for mounting the tube light.

5. The airbag tube light according to claim 4, wherein each latch further comprises a safety pin, and the safety pin is passed through the locking portion and the rotation portion to lock the locking portion and the rotation portion.

6. The airbag tube light according to claim 1, wherein the reflective cover comprises a cover body and a top plate, wherein the cover body has openings at two ends and is hollow inside, the top plate is hermetically provided in the openings at an end of the cover body, and the opening at the end of the cover body relative to the top plate forms an opening of the reflective cover, wherein the top plate is provided with a through hole for the latch to pass through, and the plate body is provided in the through hole and abutted against the top plate.

7. The airbag tube light according to claim 6, wherein the top plate is provided with straps, and the straps are provided in a width direction of the top plate, wherein when the plate body of the tube light bracket is provided over the through hole in the top plate, the straps are pressed against the plate body, to press and fix the plate body of the tube light bracket to a top surface of the top plate.

8. The airbag tube light according to claim 1, wherein the airbag tube light further comprises a gooseneck bracket, wherein the gooseneck bracket comprises a connection seat and a connection rod, the connection seat is detachably connected to the tube light bracket, and an end of the connection rod is connected to the connection seat and another end of the connection rod is connected to an external device for fixing the airbag tube light to the external device.

9. The airbag tube light according to claim 8, wherein the gooseneck bracket further comprises a fastener, wherein the connection seat comprises a first connection plate and a second connection plate, the first connection plate is opposite to the second connection plate, and an end of the connection rod is provided between the first connection plate and the second connection plate; and the fastener is passed through the first connection plate and the second connection plate and abutted against the first connection plate and the second connection plate, for adjusting a spacing between the first connection plate and the second connection plate, to adjust a looseness or tightness between the connection rod and the connection seat.

10. The airbag tube light according to claim 9, wherein the connection rod comprises a rod body and a connection head provided at an end of the rod body, the connection head is spherical, and an outside of the connection head is provided with a plurality of teeth.

11. The airbag tube light according to claim 10, wherein a bottom of the first connection plate is hinged to a bottom of the second connection plate.

12. The airbag tube light according to claim 1, wherein the airbag is a cylindrical air column, and a soft surface of the airbag is protruded out of the opening of the reflective cover when the airbag is fixed to the opening of the reflective cover.

13. The airbag tube light according to claim 12, wherein a bottom surface of the airbag is provided with an inflation opening for inflating the airbag.

* * * * *